United States Patent [19]

Vogel

[11] 4,332,419
[45] Jun. 1, 1982

[54] SEAT

[76] Inventor: Ignaz Vogel, Kleinsteinbacher Str. 42-44, Karlsruhe 41-Stu, Fed. Rep. of Germany, 7500

[21] Appl. No.: 113,619

[22] Filed: Jan. 21, 1980

[30] Foreign Application Priority Data

Jan. 23, 1979 [DE] Fed. Rep. of Germany ....... 2902386

[51] Int. Cl.³ .......................... A47C 4/02; A47C 27/05
[52] U.S. Cl. ............................. 297/443; 297/DIG. 1; 297/DIG. 2; 297/452; 297/456
[58] Field of Search ............... 297/456, 455, 444, 452, 297/DIG. 1, DIG. 2, 440, 443

[56] References Cited

U.S. PATENT DOCUMENTS

| | | | |
|---|---|---|---|
| 2,838,100 | 6/1958 | Follows | 297/DIG. 1 |
| 3,054,643 | 9/1962 | Militano | 297/DIG. 2 |
| 3,537,752 | 11/1970 | Kushnarov et al. | 297/DIG. 2 |
| 3,713,696 | 1/1973 | Dudley | 297/DIG. 1 |
| 3,727,980 | 4/1973 | Tischner | 297/DIG. 2 |
| 3,853,352 | 12/1974 | Ambrose | 297/DIG. 1 |
| 3,861,747 | 1/1975 | Diamond | 297/DIG. 1 |
| 4,025,114 | 5/1977 | Cave | 297/455 |

Primary Examiner—James T. McCall
Attorney, Agent, or Firm—Klaus J. Bach

[57] ABSTRACT

A seat comprising seating and backrest members mounted on a seat support structure.

The seating and backrest members are molded plastic foam members lined with an upholstery material and including reinforcement and mounting frames which are foamed into the molded plastic members such that they are integral therewith. The support structure has mounting clips projecting into openings in the molded plastic members and engaging the reinforcement and mounting frames therein.

With this arrangement the molded plastic members can be easily exchanged without the use of tools but they are, nevertheless, firmly held in position.

6 Claims, 7 Drawing Figures

Fig. 1
Fig. 2
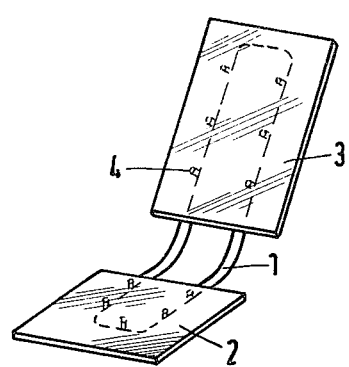
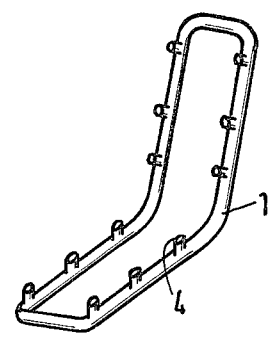
Fig. 3
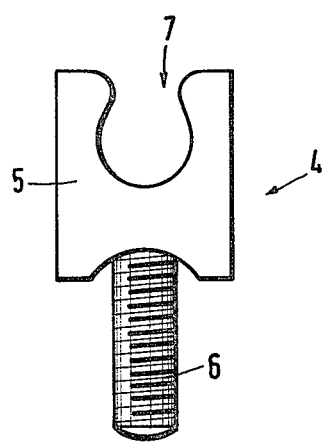

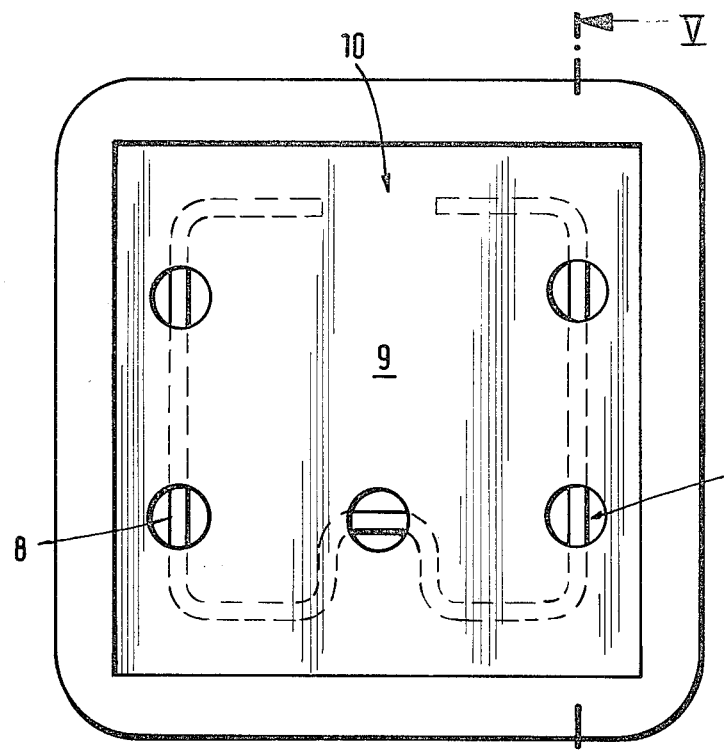
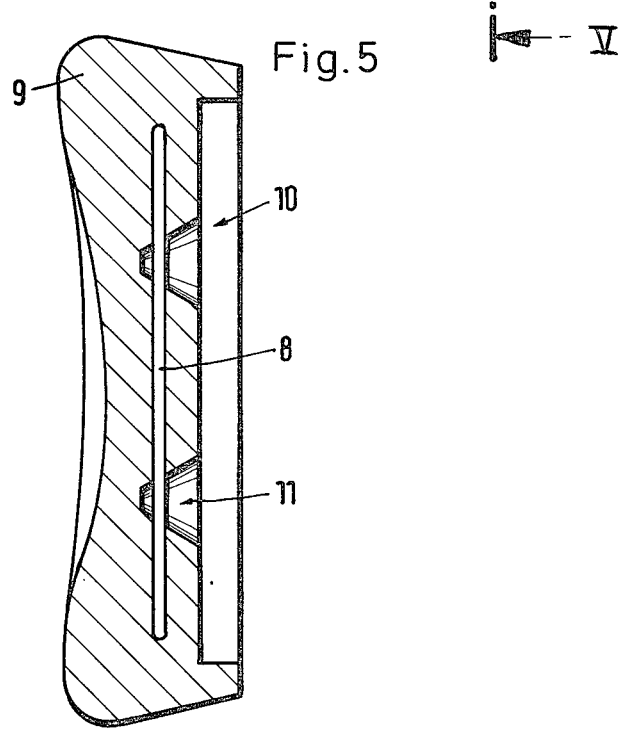

SEAT

BACKGROUND OF THE INVENTION

1. Field of the Invention

The invention relates to a seat, particularly a passenger seat, comprising a support structure and upholstered seat and back member mounted on the support structure by mounting means, the upholstery consisting of plastic foam with a lining of upholstery material.

2. Description of the Prior Art

In seats of this type the plastic foam members are usually mounted on mounting plates; usually they are cemented on the mounting plates. Another practice is to hold the plastic foam in place by means of the upholstery material which extends beyond the edges of the mounting plate and is connected thereto by nails, by press fasteners or by interlacing. On passenger seats, however, which have to take up substantial forces in the plane of the seating surface, mounting of the upholstery by means of press buttons or even by interlacing is inadequate. Accordingly, the only possible mounting is by nailing or cementing. Consequently, if seating members have to be changed it is not sufficient to exchange the relatively inexpensive plastic foam part. Rather it is necessary to exchange also the support plate, and this is quite time consuming. If the plastic foam alone is to be changed at least the remainder of the foam and cement has to be removed from the support plate before the new upholstery foam member can be mounted.

While such seats are quite simple and have low original manufacturing costs, they are relatively difficult to exchange so that repair work as a result of seat damage is relatively expensive.

It is an object of the present invention to provide a seat in which the plastic foam seat upholstery portions are firmly supported on the seat supports—as this is an absolute necessity in connection with passenger seats—but which nevertheless are removable and new seat upholstery portions can easily be mounted without time-consuming labor.

All the seats known so far required a plate or other mounting support for the plastic foam members since the foam members do not have sufficient rigidity to accept the forces acting thereon during use of the seats. It is therefore another object of the present invention to provide a seat in which the plastic foam seating and back support members are of such strength that they can be directly mounted on the seat support structure without the usual support plates.

SUMMARY OF THE INVENTION

A seat comprising a support structure supporting seating and backrest members consisting of molded plastic foam members covered by an upholstery material. A reinforcement and mounting frame of rigid wire is foamed into the molded plastic foam members so as to be integral therewith and the support structure has mounting means projecting therefrom and extending into the molded plastic foam members for engagement with the wires of the reinforcement and mounting frame therein.

The molded plastic foam members are strengthened by the integral wire frame to such a degree that, in most applications, no support plate is necessary. The mounting means for mounting the molded plastic foam members to the support structure may be hooks, screws or similar fasteners. The preferred mounting means, however, are mounting clips consisting of a slightly resilient plastic material which are mounted on, and project from, the support structure and have at their free ends lyre-formed openings of a slightly smaller cross-section than that of the reinforcement wires which they snugly engage. The use of such mounting clips avoids the need for tools when replacing the foam members since they can readily be pulled out of the resilient mounting clips, and new foam members can just as readily be mounted simply by pressing the reinforcement wires of the new foam members into the mounting clips. In order to avoid movement of the plastic foam members relative to the support structure, at least one of the mounting clips is so oriented that the axis of its opening is normal to the axes of the openings in other mounting clips and engages a wire section of the support frame which is normal to the wire sections engaged by the other mounting clips. Rattling of the seating and backrest members can be avoided if the height of the mounting clips is slightly less than the corresponding distance of the wires from the support structure or a support plate disposed on the support structure so as to provide for firmly abutting engagement of the molded plastic foam members with the support plate or directly with the support structure in such a manner that the whole mounting means between the support structure and the molded plastic foam member remains under slight tension.

It is further advantageous if the reinforcement and mounting frame is so arranged within the molded plastic foam members that it has portions extending near the circumference thereof for strengthening of the heavily strained molded foam members. Then, the reinforcement and mounting frame has preferably lyre-shaped portions curved inwardly from the circumference of the frame and the mounting means are so arranged that they engage the frame at the innermost sections of the curved portions.

Since the mounting frame is integral with the molded plastic foam member it may, of course, consist of separate parts if this is considered to be suitable for a particular application.

BRIEF DESCRIPTION OF THE DRAWINGS

The invention will become more readily apparent from the following description of preferred embodiments thereof shown, by way of example only, in the accompanying drawings, in which:

FIG. 1 shows a seat support structure including a support plate;

FIG. 2 shows a tubular seat support structure;

FIG. 3 shows a mounting clip;

FIG. 4 is a bottom view of a molded plastic foam seating member;

FIG. 5 is a side view of a molded plastic foam seating member;

DESCRIPTION OF THE PREFERRED EMBODIMENT

Figure 6:
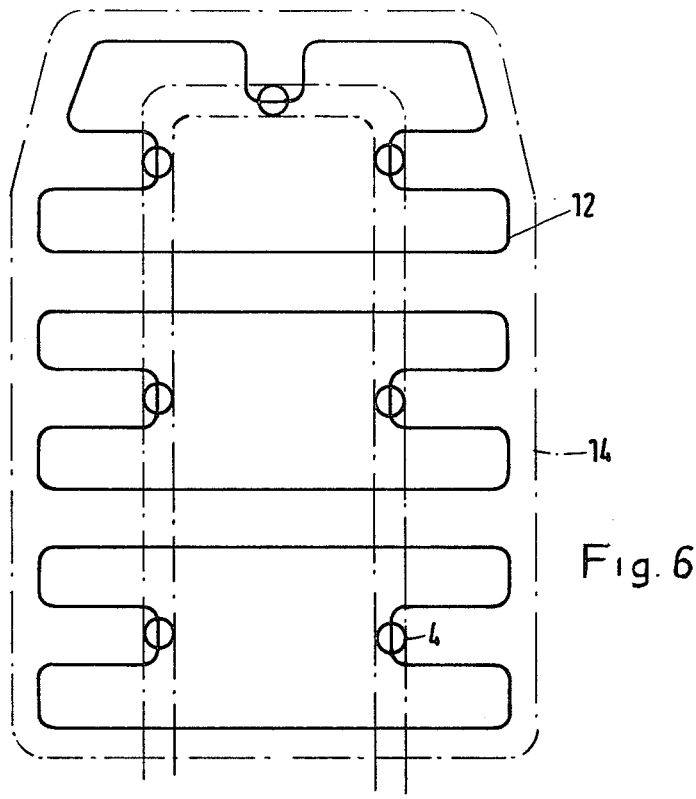
FIG. 6 shows a reinforcement and support frame for a molded plastic foam backrest member.

As shown in FIG. 1 a tubular seat support structure 1 carries support plates 2, 3. Mounting clips 4 project from the support plates 2, 3 which mounting clips 4, as shown in FIG. 3, consist of a clip portion 5 of slightly elastic plastic material mounted on a screw bolt 6. The clip portion 5 has a lyre-shaped opening 7 whose inner diameter is slightly less than the diameter of the wires of a mounting and reinforcement frame 8, (FIG. 5). FIG. 2 shows a seat support structure in which the mounting clips are directly mounted on the tubular seat support members 1. FIG. 4 shows a molded plastic foam seating member 9 which has foamed into it a mounting and reinforcement frame 8 such that the frame 8 is integral with the molded plastic foam seating member. The plastic foam seating member 9 is adapted to be mounted on top of the support plate 2 and, for this purpose, has at its bottom side a recess 10 for the reception of the support plate 2. At five points, the plastic foam seating member 9 has funnel-shaped cavities 11 which extend to, and slightly beyond, the mounting and support frame 8 and into which the mounting clips 4 extend for engagement with the support frame 8.

Figure 7:
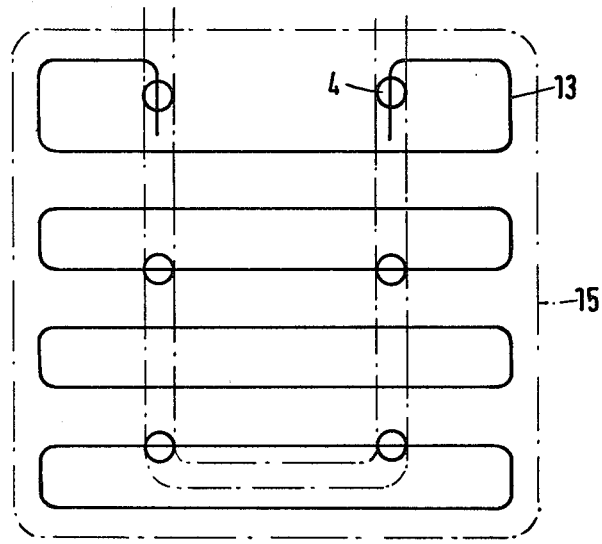
FIG. 7 shows a reinforcement and support frame for a plastic foam seating member.

FIGS. 6 and 7 show mounting and reinforcement frames 12 and 13 for, respectively, a backrest member 14 and a seating member 15 (shown in dash-dotted lines).

For mounting the molded plastic foam members 9 on the support structure 1 or on the support plates 2, the reinforcement and support frames 8 of the molded plastic foam members 9 only need to be pushed into the mounting clips 4. The molded plastic foam members 9 are then firmly held in position by the mounting clips such that they do not come loose if this is not desired. Movement of the reinforcement and support frames 8 in the mounting clips 4 is prevented because the opening 7 of one of the mounting clips 4 and the portion of the reinforcement and support frame 8 received thereon extend in a direction normal to that of the other mounting clips 4 and the respective reinforcement and support frame portions 8.

The molded plastic foam members 14, 15 of FIGS. 6 and 7 include reinforcement and support frames 12, 13 consisting of separate parts. They have portions extending along the circumference of the foam members 14, 15 and portions which extend across the foam members. This arrangement provides for good rigidity and permits direct mounting on the support frame 1 without the use of support plates 2, 3.

I claim:

1. A seat, especially a vehicle passenger seat, comprising: a support structure; seating and backrest members removably mounted on said support structure, each consisting of a molded plastic foam member; with a reinforcement and support frame of rigid wire foamed in a predetermined pattern into said molded plastic foam member so as to be integral therewith; and support means associated with said support structure and projecting therefrom, each of said molded plastic foam members having spaced openings extending into said foam member and arranged in a pattern corresponding to the pattern of the reinforcement and support frame therein such that the rigid wire of said support frame intersects, and is exposed in, said openings and said support means being arranged in the same pattern and having mounting clips extending into said openings and catchingly engaging and supporting said exposed wire therein for releasably supporting said seating and backrest members.

2. A seat as recited in claim 1, wherein said reinforcement and support frame has sections extending essentially near the circumference of said molded plastic foam members.

3. A seat as recited in claim 2, wherein said reinforcement and support frame has lyre-shaped portions curved from the circumference toward the center of the molded plastic foam members and said support means engage said frame at the innermost sections of said curved portions.

4. A seat as recited in claim 1, wherein said reinforcement and mounting frame consists of at least two separate parts.

5. A seat as recited in claim 1 or 4, wherein said support structure includes support tubes and said wires have portions extending in said molded plastic foam members in a direction essentially normal to said support tubes, and said support means are arranged at the crossover points of said support tubes and said wire portions.

6. A seat as recited in claim 1, wherein said openings in said plastic foam members are funnel-shaped so as to facilitate mounting of said molded plastic foam members onto said support means.

* * * * *